Feb. 1, 1938.　　　　F. T. KREIN　　　　2,106,893
METHOD OF MAKING FROZEN CONFECTIONS
Filed May 6, 1935　　　5 Sheets-Sheet 1

Inventor
Frederick Thomas Krein

Patented Feb. 1, 1938

2,106,893

UNITED STATES PATENT OFFICE 2,106,893

METHOD OF MAKING FROZEN CONFECTIONS

Frederick Thomas Krein, Park Ridge, Ill., assignor to Dixie-Vortex Company, a corporation of Delaware Application May 6, 1935, Serial No. 19,939

3 Claims. (Cl. 107—54)

This invention relates to improvements in the method of making a frozen confection package of the general character wherein a frozen confection, such as ice cream, sherbet or the like, is provided with a chocolate covering and the whole is contained in a temporary wrapper.

In the frozen confection industry, a rapidly growing practice is the packaging of frozen confections of the character of ice cream, sherbets, and the like, in a temporary wrapper. The confections are delivered to the retail dealer so packaged, and the temporary wrapper may be stripped from the confection at the time of serving. One of the most popular forms of frozen confections is a quantity of ice cream or the like completely or partially covered with a chocolate coating. Difficulty has been heretofore experienced in providing a chocolate coated frozen confection in as economical a manner as is desired, and this has been especially true where it has been desired to provide such a confection in a temporary wrapper with the wrapper adhering to the confection, the wrapper being stripped or peeled from the confection at the time of serving or consuming. Insofar as I am aware, it has not as yet been possible to line a wrapper of paper, for example, with chocolate, and freeze a confection in and to the chocolate with sufficient facility and economy to warrant commercial production on a quantity basis.

The invention also includes a new and novel method of providing a confection covered with a different material and characterized by the steps of spraying the coating material into a temporary wrapper to form a complete or partial lining, and then placing the confection in a relatively soft condition within the lining, and hardening the confection therein.

The invention also contemplates a method providing a chocolate coated frozen confection in a paper wrapper strippable from the confection when desired, the method being characterized by the seating of the wrapper in a holder with marginal portions overlapped but ungummed, and a spraying of the chocolate into the wrapper, the chocolate adhering to the inside surface of the wrapper and retaining the same in its desired form, the confection being frozen in the wrapper after the latter has been sprayed with the chocolate.

A further provision of the invention is a new and novel method of forming a frozen confection of a two-tone character, a portion of the confection being coated with an edible substance of different character and kind from the remaining part of the confection, the remaining part of the confection projecting without the coated substance to give a two-tone appearance to the entire confection.

Another provision of the invention is a method of providing a completely chocolate coated frozen confection in a temporary wrapper which is easily removable from the confection when desired.

A still further provision of this invention is a new and novel method of providing a frozen confection partially or completely coated with chocolate and the whole contained in a temporary wrapper of paper or the like formed to permit complete stripping of the wrapper from the confection at once, or a progressive stripping of portions of the wrapper from the confection.

To prepare each frozen confection package separately is so expensive and laborious as not to be feasible, in most cases, for commercial production. In commercializing items of this character, simplicity, ease of handling, and economy are very highly desirable, if not essential.

While some of the more salient features, characteristics and advantages of this invention have been above pointed out, others will become apparent from the following disclosures.

The frozen confection in general comprises a center of ice cream or the like surrounded by a relatively thin shell of chocolate or equivalent flavoring or blending medium. The chocolate coated confection may be of substantially any desired shape, but is preferably conical to facilitate handling and eating of the same. The confection is encased in what may be termed a temporary wrapper, this wrapper or container being of such economical material as to be destroyed and discarded at the time it is desired to eat the confection. The wrapper may be in the form of a conical paper cup and may be stripped entirely from the confection at one time, or may be selectively stripped therefrom, portion by portion, in the event the confection is eaten out of the container. In this latter case, the confection will be consumed in the same manner as the commonly known ice cream cone. If so desired, the chocolate or other coating material may cover the confection entirely, or such material may terminate below the upper end of the ice cream, and if the two materials used are ice cream and chocolate, a two-tone and highly attractive color effect will be produced upon the stripping away of the wrapper or container.

The method of providing the confection begins with the placing of a plurality of containers in a rack or tray. These containers are preferably made of paper of the character used in paper drinking cups, and are preferably conical in shape with overlapping marginal portions. These overlapping marginal portions need not be held together by an adhesive or similar means. After the placing of the cups or containers in position, a lining of chocolate or similar material of a desired depth and thickness is progressively sprayed against the inside walls of the containers. This lining will immediately adhere to the container and maintain the overlapped margins of the container in position. Before the chocolate lining has completely chilled, the container is filled with a partially or semi-frozen confectionery mass, such as ice cream, and there will be a sympathetic bond or adhesion between the confectionery mass and the chocolate lining in the container. After the addition of the confectionery mass, the entire rack or tray of containers is moved to a refrigerating room and the confection solidified. The ice cream and chocolate are both thus hardened, and by their inherent adhesion the ice cream and chocolate are bonded together, and by the inherent adhesion of the chocolate it is united to the cup or container. However, the container being preferably of a dry waxed or wax coated paper, the adhesion of the chocolate to the container is not such that will prevent an easy stripping of the container from the chocolate. The container is preferably provided with a plurality of tear tabs, one above the other, and by means of these tabs, the container may be progressively stripped from the confection as the same is consumed, or, if so desired, the container may as readily be stripped entirely from the confection at once. If it is desired to cover the exposed portion of the ice cream with chocolate, the upper surface of the ice cream may be sprayed with chocolate prior to the refrigerating of the whole.

The apparatus in general includes a rack or tray for holding a plurality of cups or containers, this rack or tray being of a known character, the specific structure of which does not form a part of this invention. The spraying mechanism embodies a hopper or bin for containing chocolate or whatever substance is to be sprayed. If this substance is chocolate, lumps of chocolate may be placed in the hopper and the hopper floor, which is inclined, and adjacent parts if necessary, are heated in a suitable manner to melt the chocolate. A plurality of spraying nozzles project, preferably from the lowermost portion of the hopper, and these nozzles are equal in number to the number of containers held by the tray. The outlet from the hopper through each nozzle is valve-controlled. Some form of pressure, preferably pneumatic, is provided in the hopper to forcibly expel the chocolate or other substance through the respective nozzles. Each nozzle is provided with a hood floating thereupon, the hood embracing the top of a cup to prevent the spraying of the chocolate anywhere except within the cup. The actuation of the valve means controlling the flow of chocolate through the nozzles may be electrically or mechanically governed. Either the spraying mechanism or the cup-holding tray is movable relatively to the other, and the valve means are actuated in response to a predetermined portion of such movement. This relative movement results in a spraying nozzle moving a predetermined distance into and then out of a cup, the nozzle preferably spraying while moving in both directions, resulting in a progressive uniform coating of the inside surface of the cups. The thickness and depth of this coating can be predetermined by obvious adjustments of the mechanism. After the spraying operation, the tray of cups or containers is removed from the immediate vicinity of the spraying mechanism, and by means of a slab filler or other device, the specific construction of which does not form a part of this invention, the cups are filled with a confection such as ice cream, sherbet, or the like, preferably in a semi-frozen or plastic condition. After the filling operation, the entire tray with its filled cups is transferred to another location for refrigeration.

The invention includes these and other features of construction, combinations of parts, and process steps, the apparatus and product being shown in several forms in the drawings, as more particularly indicated by the claims.

For the purposes of clarity and brevity in the following description, the present invention will be described in connection with a confection comprising a chocolate coating on ice cream. It will, however, be understood that sherbets, ices, and similar substances may equally as well be used, and it will also be understood that some other substance besides chocolate adaptable for use in the manner, by the method, and with the apparatus disclosed herein will not be without the purview of the invention.

Figure 1:
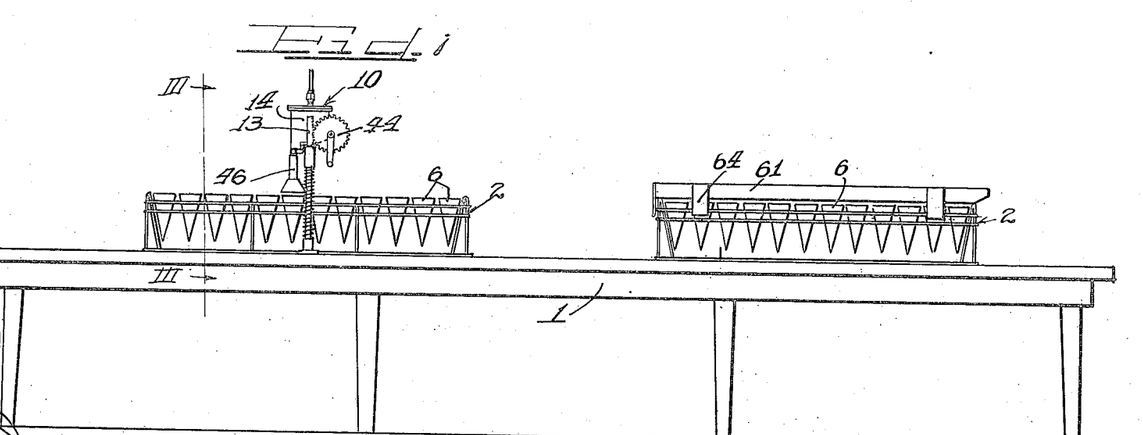
Figure 1 is a fragmentary somewhat diagrammatic view in elevation of apparatus embodying principles of the present invention, the figure further illustrating two steps in the method embodying principles of the present invention.
Figure 2:
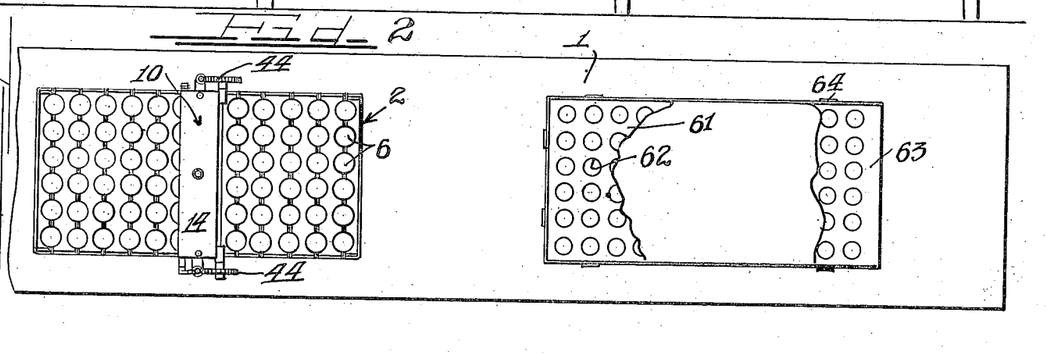
Figure 2 is a fragmentary top plan view of the structure shown in Figure 1, with parts removed and parts broken away.
Figures 4, 6, 8:
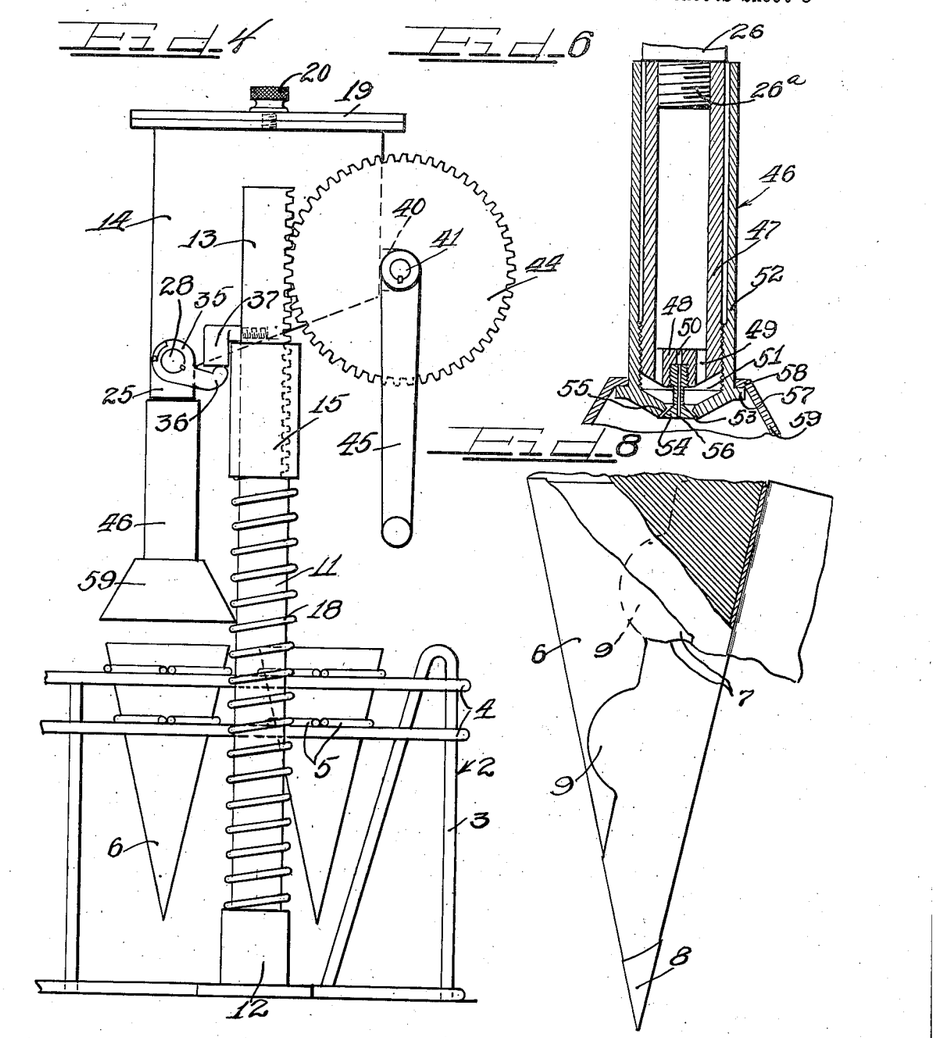
Figure 4 is a fragmentary side elevational view, taken from the right hand side of Figure 3, with the table or platform removed.
Figure 6 is an enlarged fragmentary vertical sectional view of the nozzle construction taken substantially as indicated by the line VI—VI of Figure 3, looking in the direction of the arrows.
Figure 8 is an enlarged part sectional, part elevational view of a completed confectionery product embodying principles of the present invention, illustrating one manner in which the outer wrapper may be removed from the confection.
Figure 7:
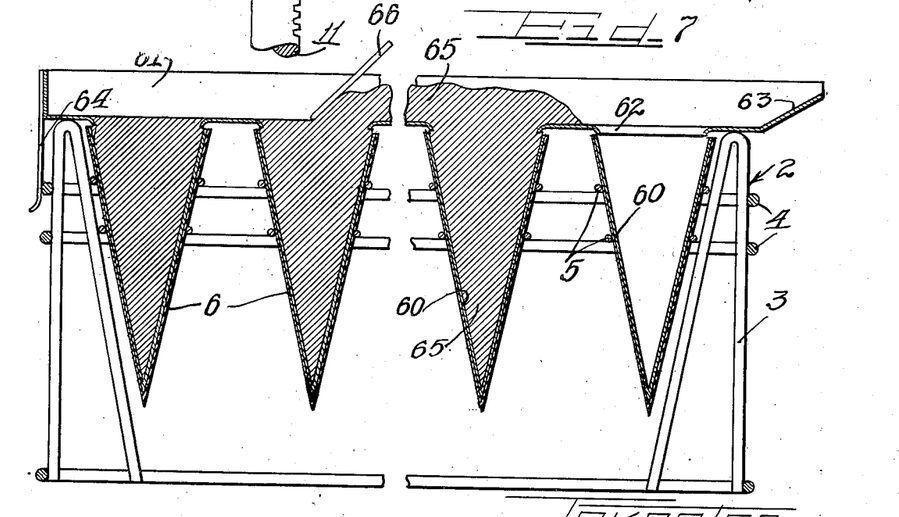
Figure 7 is an enlarged fragmentary vertical sectional view through the tray and slab filler shown in the right hand portion of Figure 1, illustrating a further step in the method embodying principles of this invention.

With reference to Figure 1, it will be seen that any suitable form of table or platform 1 may be provided. This table is of a size to suitably support a rack or tray, generally indicated by numeral 2, and permit the backward and forward movement of the tray upon the table. The tray or rack 2, in this instance, is made up of wire strands bent to suitable shape and comprises a plurality of upright supports 3 (Figures 4 and 7) spaced at desirable points around the tray, and a plurality of peripheral side rails 4. Extending at spaced intervals across the tray from one side thereof to the other is a plurality of pairs of supporting members or wires 5 which are brought together at their ends, as seen in Figure 4, and expanded at spaced intervals to form cup or container holding sockets, the wires being brought in between each such socket. Certain parts of the tray being metallic wire, these parts are preferably held together by spot-welding them at meeting points. As illustrated, the tray 2 is designed to hold a plurality of containers or cups of conical form, but it will be obvious that the tray may be equally as well adapted to support containers of any desirable shape. Further, it will be noted that this is not the only tray construction that may be utilized, wire strand trays being highly recommended because of the minimum amount of metal being used and because the containers are open on all sides for free circulation of air during refrigeration. The tray 2 may be designed to hold any desirable number of containers, half a gross being found an advantageous number for commercial production.

With reference more particularly to Figure 8, it will be seen that each cup or container 6 is formed from a single sheet or blank of material, preferably paper of the character commonly used in paper drinking cups. For the particular purposes intended in the present invention, a dry waxed paper is found particularly advantageous, but wax coated paper or any suitable paper may be utilized. The blank is formed or folded so as to provide overlapping margins 7, and the blank may be so shaped that a portion of one of these margins extends around the tip of the formed conical container, as indicated at 8, if so desired. These overlapped margins 7 may be held together with a suitable form of adhesive, if so desired, such adhesive being of sufficient amount and location as to effectively hold the container in shape but insufficient to prevent a ready separation of the margins to strip the container from a confection therein contained. However, it is not essential that any adhesion or securement whatsoever be had in connection with these overlapped margins. The tray 2 will hold the container in form when the same is deposited in one of the sockets of the members 5, and when the melted chocolate is sprayed into the container, it will adhere to the inner walls of the container and hold the overlapped margins in proper position. The external margin of the cup or container 6 is preferably provided with a plurality of spaced projections or tear tabs 9, two being shown. With the aid of these tear tabs, a cup may be progressively stripped from its confection to facilitate the consuming of the confection directly from the cup.

A tray 2 may be served with cups 6 in any desirable manner, such as dropping the cups into the tray sockets by hand. After so being filled with cups, the tray is placed beneath a spraying mechanism, generally indicated by reference numeral 10 in Figures 1 and 2. The spraying mechanism 10, as illustrated in Figures 1 to 6, inclusive, is a relatively small portable device, designed for hand operation, and in this instance it is only capable of spraying chocolate into a single transverse row of cups. The tray must be moved sufficiently to bring the next row of cups under the spraying mechanism, after each spraying operation.

Figure 3:
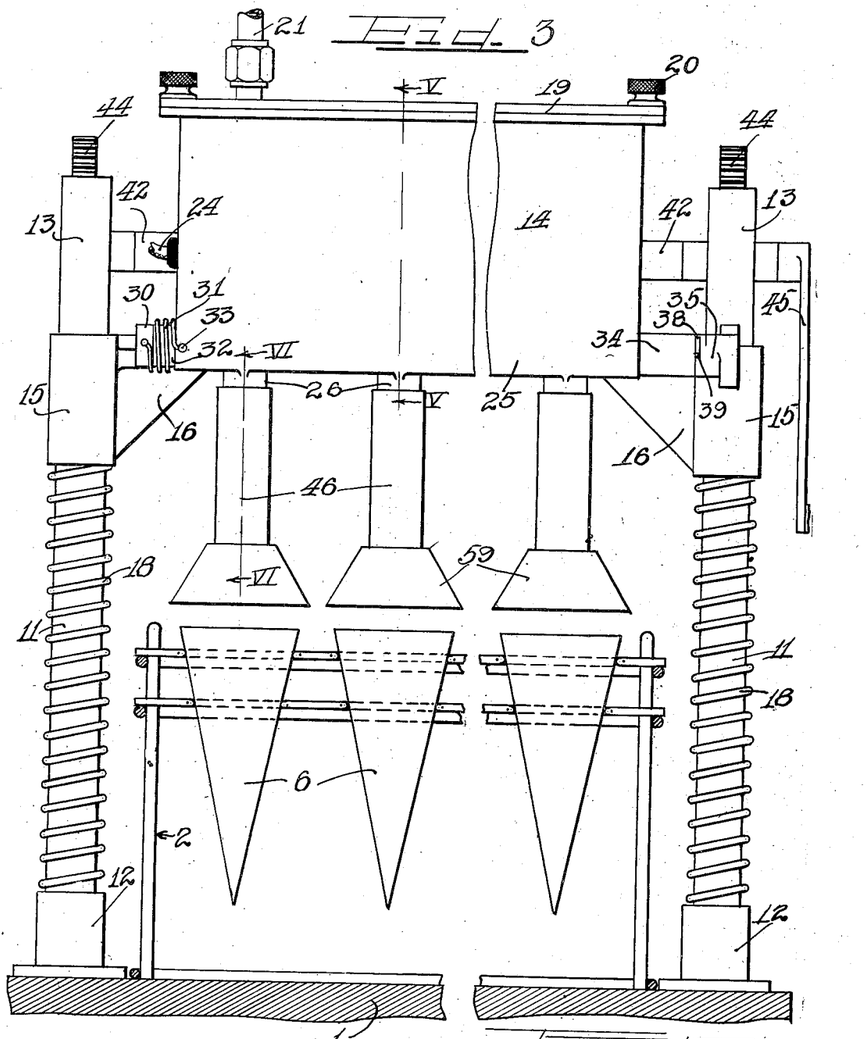
Figure 3 is an enlarged fragmentary vertical sectional view, with parts broken away, of the structure shown in Figure 1, taken substantially as indicated by the line III—III of Figure 1, looking in the direction of the arrows.
Figures 5, 9, 10:
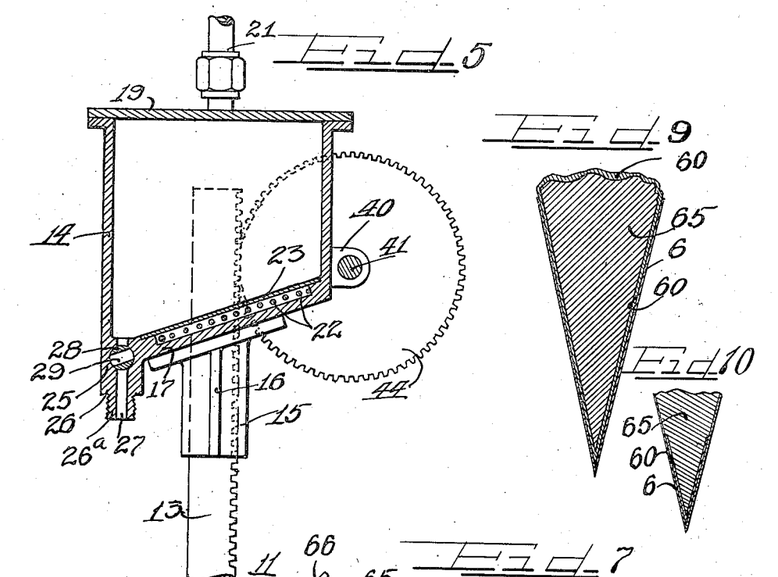
Figure 5 is a fragmentary vertical sectional view taken substantially as indicated by the line V—V of Figure 3, looking in the direction of the arrows.
Figure 9 is a central vertical sectional view through a completed confectionery product of a slightly different form.
Figure 10 is a central vertical sectional view through a completed confectionery product of a still different form.

The spraying mechanism 10, specific reference being had to Figures 3, 4 and 5, includes a pair of spaced uprights 11—11, each of which is provided with a foot 12 resting upon or secured to the table 1, as may be desired. At the upper end thereof each upright is toothed to form a rack bar 13 for a purpose that will later appear.

A hopper or bin 14, preferably of metal, is disposed between the uprights and supported by a pair of sleeves 15 freely mounted for slidable movement on the uprights. Each sleeve 15 is provided with an integral bracket 16 projecting therefrom and secured in any desirable manner to the forwardly sloping bottom 17 of the bin. A coiled spring 18 surrounds each upright between the respective foot 12 and sleeve 15 and these springs maintain the bin in an elevated position when the spraying operation is not being performed.

The bin 14 is provided with a suitable cover 19 held on the bin preferably in an air tight manner by means of a plurality of thumb studs 20 or in any other suitable manner. A flexible feed line 21 also enters the bin through the cover 19 to provide compressed air sufficient to build up a pressure within the bin, and expel the contents thereof when the valve means to be later described herein are opened. The flexible pipe line 21 may lead to any suitable source of compressed air, not shown in the drawings.

The sloping bottom 17 of the bin is provided with a recess containing an electrical heating element 22 (Figure 5), and the heating element and recess are covered by a metallic plate 23. An electrical cable conductor 24 (Figure 3) may be connected to any feasible source of electrical energy to provide current for the heating element 22. Lumps or chunks of chocolate may be placed in the bin and melted therein by means of the heating element. The molten chocolate will flow towards the lower forward end of the bin. In this region, the bin is provided with a downwardly extending portion 25 having portions 26 with threaded nibs 26a of reduced size depending therefrom at spaced intervals to function as supports for spray nozzles. In each nib 26a is an aperture 27 extending through the portion 25 immediately thereabove to provide communication with the interior of the bin.

Transversely disposed on the depending bearing portion 25 is a transversely extending rotatable shaft 28 which functions as a valve to control the outlet of chocolate through the ports 27. In line with each of the ports 27, the shaft is provided with a transverse aperture 29 which, when turned in alignment with the ports 27, permits the outflow of melted chocolate, and when turned transversely thereto, as seen in Figure 5, effectively prevents the outflow of chocolate.

At one end thereof, without the bearing portion 25, the shaft 28 is provided with a collar 30 to which one end of a coiled spring 31 surrounding a bearing portion 32 is connected. The other end of the coiled spring is connected to the side of the bin 14, as indicated at 33. The spring is so coiled as to continuously rotate the shaft 28 into position with the apertures 29 aligned each with its respective port 27. In other words, the spring 31 constantly urges the shaft 28 into open position. At the other end thereof, the shaft 28 extends through a bearing member 34 and is provided with a collar 35 keyed to the shaft. This collar 35 has an integral arm 36 extending therefrom into an abutment 37 screwed into the respective upright 11 (Figure 4).

Opposite the arm 36, the collar 35 is notched as at 38 (Figure 3), and a detent 39 secured to the bearing piece 34 projects into the notch to limit the rotation of the valve shaft 28. This detent 39 also limits the upward movement of the sleeves 15 and bin 14 in response to the action of the springs 18 on the uprights 11—11. The notch 38 is of the proper length to permit a movement of the valve shaft from its closed position as seen in Figure 5, to open position with the apertures 29 in alignment with the ports 27. It will be seen, therefore, that when the bin 14 is in its elevated position, the valve shaft is maintained in closed position by means of the arm 36 and detent 37, the springs 18 obviously being stronger than the spring 31. However, when the bin is lowered in a manner about to be described, the arm 36 moves away from the detent 37 and permits the spring 31 to rotate the valve shaft so as to open the ports 27. By adjusting the valve shaft relatively to the ports in an obvious manner, the ports will be opened after the valve shaft has moved downwardly a predetermined distance.

The mechanism for elevating or lowering the bin 14 includes a pair of spaced bearing brackets 40 projecting from the rear wall of the bin (Figures 4 and 5), thus suitably supporting a shaft 41. A bearing member 42 projects from each end of the bin 14 (Figure 3) and also supports the shaft 41. Adjacent each end thereof, the shaft carries a hubbed gear wheel 44, which are keyed to the shaft and meshed with the respective racks 13 on the uprights 11—11. One end of the shaft 41 has a crank arm or handle 45 keyed thereto by which the shaft may be rotated to lower the bin 14 against the action of the springs 18 during the spraying operation. The rack 13 being integral with the uprights 11—11 and therefore immovable, the gears 44 will roll down the rack carrying the bin therewith.

Secured to each of the threaded nibs 26a of the depending portions 26 of the bin is a spray nozzle unit 46. With reference to Figure 6, it will be seen that each nozzle unit 46 includes a hollow inner member 47 threadedly engaged with the respective nib 26a. The lower end of the member 47 is closed, as at 48, with the exception of a plurality of spaced apertures 49 and a central aperture 50 of smaller size than the apertures 49. Direct communication is provided between the inside of the bin 14 and the spraying ends of the nozzles 46 by means of these apertures 49 which lead into an annular cavity 51 formed between the lower end of the member 47 and the inner wall of the lower end of a tubular member 52 threadedly engaged over the member 47. A central aperture 53 having flaring walls is provided in the lower end of the member 52. Centrally disposed in the aperture 53 is a spray defining member 54 threadedly engaged in the portion 48 of the member 47. This spray defining member is flared outwardly complementally to the walls of the aperture 53 but is of less size than the aperture to provide an annular opening 55 therebetween through which melted chocolate may be sprayed against the walls of a cup or container 6. The member 54 is also provided with a central relatively small aperture 56 through which a lesser quantity of chocolate is sprayed into the lower end of a cup 6 to insure a distribution of chocolate in that portion of the cup.

It will be noted that the lower end of the member 52 is provided with an outwardly extending annular flange 57 engaged on its top surface by an inwardly turned flange 58 on the upper end of an outwardly flaring hood 59. The flange 57 merely keeps the hood from falling off the spraying nozzle 46, the hood being freely slidable up and down around the nozzle. This hood engages over the upper edge of a cup 6 and prevents the spraying of chocolate elsewhere than in the cup.

From the foregoing, it will be understood that in the making of a frozen confection in accordance with the teachings of this invention, the cup sockets in a tray 2 are filled with conical paper cups 6 of the character above set forth. The tray is next put in position on the table 1 beneath the chocolate spraying mechanism so that the row of spraying nozzles 46 is in alignment with a corresponding row of cups in the tray. The handle 25 is then turned in the proper direction to lower the bin or hopper 14 and after a predetermined movement, the spring 31 actuates the valve shaft 28 to open the ports 27 leading into the spraying nozzles. The compressed air pumped into the bin through the flexible line 21 forcibly expels the melted chocolate through the spraying nozzles 46 as these nozzles slowly descend within the respective cups. Any suitable form of limiting means may be provided in an obvious manner to determine the distance the bin may be lowered and likewise the distance the spraying nozzles project within the cups. Upon reaching this point, the handle is turned in the other direction sufficiently to permit the springs 18 to slowly raise the bin 14, the nozzles continuing their spraying action while leaving the cups. The hoods 59 obviously prevent the spraying of the chocolate outside of the cups.

It may not be deemed necessary to have the mechanism spray chocolate over the inner walls of the cups during both the up and down movement of the spraying nozzles, and if such is not desired, the mechanism can be adjusted accordingly. It will be noted that a progressive and uniform spray results so that each cup is progressively and uniformly lined with chocolate as seen clearly at 60 in Figure 7. The melted chocolate will adhere to the walls of the lining and will not tend to run down the walls and accumulate in the point of the cup. If such accumulation should inadvertently occur, it is a simple expedient to chill the cups prior to the spraying of the chocolate to insure a quick stiffening of the chocolate sufficient to overcome the action of gravity.

The thickness of the chocolate lining in the container can obviously be controlled in several ways; for example, by the speed with which the spraying nozzles are moved into and out of the cups, and also by adjusting the member 54 in the spraying nozzle structure to vary the size of the spraying opening 55. The depth of the chocolate lining from the top of the cup or container is controlled by the substitution one for the other of differently sized detents 37 in the respective upright 11, so that if it is desired to set the chocolate lining a distance below the upper edge of the container, a longer detent may be used causing a later opening of the valve shaft so that the spraying action will not start until after the respective spraying nozzles have entered the containers a proper distance.

After the spraying operation, the tray 2 and its chocolate lined containers are transferred to a different position on the table 1, as indicated in Figure 1, and a slab filler 61 is placed over the containers. This filler embodies a flat bottom vessel having a plurality of openings 62 in the bottom thereof consistent with the number and spacing of the cups, vertical walls on three sides thereof, and a sloping wall 63 on one side thereof. The slab filler is held in position upon the tray by a plurality of resilient brackets 64 depending from the filler.

Into this slab filler is poured a quantity of ice cream mix 65, preferably in a plastic or semi-frozen condition. By the use of a suitable squeegee 66 or similar wiping instrument, the ice cream mix 65 is swept through the apertures into the chocolate lined containers. If any excess of the mix remains, it is a simple expedient to sweep this excess over the inclined wall 63 at one end of the container into a receptacle for subsequent use.

After the filling of the chocolate lined containers with the partially frozen ice cream mix, the slab filler 61 is removed, and the tray together with its contents is transferred to a refrigerating room in which the ice cream is completely frozen.

Of course, it will be understood that the slab filler 61 is mentioned by way of example and not necessity, since in many instances the containers will be filled by some other device or mechanism.

In the forming of a complete chocolate coated confection, it will be noted that there will be an inherent adhesion between the chocolate lining and the paper cup 6, and there will also be a sympathetic bond or adhesion between the ice cream and the chocolate. However, the adhesion between the chocolate and the paper container is not sufficient to prevent the container being easily stripped from the chocolate, as indicated in Figure 8. As stated hereinabove, the container may be selectively stripped from the confection, a piece at a time as the confection is consumed out of the container, by the use of the tearing tabs 9, or the container may equally as well be stripped entirely from the confection if it is desired to consume the confection out of a vessel.

It will be noted that the making of a complete chocolate coated confection by the method of this invention embodies only one more operation than the mere packaging of plain ice cream in a temporary cup or container, that operation being merely an up and down movement of a spraying mechanism and requiring extremely little time and labor.

It may be desired to cover the upper exposed surface of the ice cream 65 with chocolate, as indicated in Figure 9. In such an event, the tray and its contents are again moved under the spraying mechanism after the filling of the lined cups with ice cream mix 65. By the use of a suitable spraying nozzle 46 and by an adjustment of slightly different character than seen in Figure 6, a chocolate coating 60 may be sprayed over the top of the ice cream, and this chocolate coating will become integral with the lining 60. After this top spraying operation, the tray and its contents may be transferred to the refrigerating room.

Another variation in the types of frozen confections that may be provided by the practice of this invention is that illustrated in Figure 10, wherein the chocolate lining is spaced a distance below the upper end of the container, and may be so provided in the container in the manner outlined above. The container is then filled with ice cream mix 65 which not only fills but overlies the upper edge of the shortened chocolate lining 60. Upon the stripping of the container 6 from the confection, a confection having an attractive two-tone color effect is revealed, the darkness of the chocolate standing out in smart contrast to the lighter coloring of the ice cream.

It has been found in practicing the present invention that a concentrated chocolate may be used, and with the use of such a substance, a very thin lining of chocolate is all that is needed within the container to adequately flavor the ice cream.

In Figures 11 to 14, inclusive, I have illustrated a different form of spraying mechanism designed for commercial production on a quantity basis larger than that for which the above described spraying mechanism is designed. In this instance, the mechanism includes an understructure 67 having angle iron supports 68—68 on opposite sides thereof. Seated upon the angle supports are uprights 69—69, each of which has a reduced upper portion 70 to form a shoulder upon which is seated a sleeve 71 embracing the reduced portion 70 and held in position by means of a nut 72. Each of the sleeves 70 has an integral supporting bracket 73 thereon suitably connected to a hopper 74 of the same general character as the previously described hopper 14, with the exception that the bottom of the hopper 74 need not be sloping, if such is not desired. The hopper or bin 74 may be equipped with a suitable heating unit for melting the chocolate and also with a compressed air pipe line.

In this instance, the hopper 74 is provided with sufficient spraying nozzles 75 to simultaneously spray chocolate into all of the containers carried by the tray, one satisfactory number being seventy-two or half a gross. The bottom of the hopper is provided with a plurality of integral depending portions 76 through each of which is an aperture 77 for the forcible exit of melted chocolate. From each of these portions 76 a spraying nozzle unit 75 depends in the manner above outlined in connection with the spraying nozzles 46. As seen best in Figure 1, the spraying nozzle 75 comprises an outer member 78, having a covering 78a of insulation, engaged upon an inner hollow member 79 apertured as at 80 for the downflow of chocolate. These spraying units 75 may be equipped with nozzles or spraying means at their lower ends of the character above described.

In this instance, the valve means which govern the outflow of chocolate through the ports 77 are electrically controlled. A flat valve member 81 overlies each of the ports 77, this valve member being keyed to or formed integrally with a shaft 82 extending through the respective portions 76 of the hopper bottom. The shaft 82 is hollow and a fixed shaft 83 extends therethrough, the fixed shaft carrying a pin 84 engaged in the portion 76 of the hopper through a slot 85 in the hollow shaft. A coiled spring 86 having one end fixed to a collar 87 secured to the fixed shaft 83 and the other end secured to the collar portion of the valve 81 tends to maintain the valve in closed position at all times. Keyed or otherwise secured to the lower end of the hollow shaft 82 is a laterally extending arm 88 projecting from the shaft on the opposite side thereof from the valve 81 directly in the path of a plunger 89 or armature of a solenoid 90. This solenoid is arranged so that upon energization thereof, the plunger 89 will be expelled or moved outwardly actuating the valve 81 against the action of the spring 86 to open the port 77.

Figures 11, 12, 13, 14, 15:
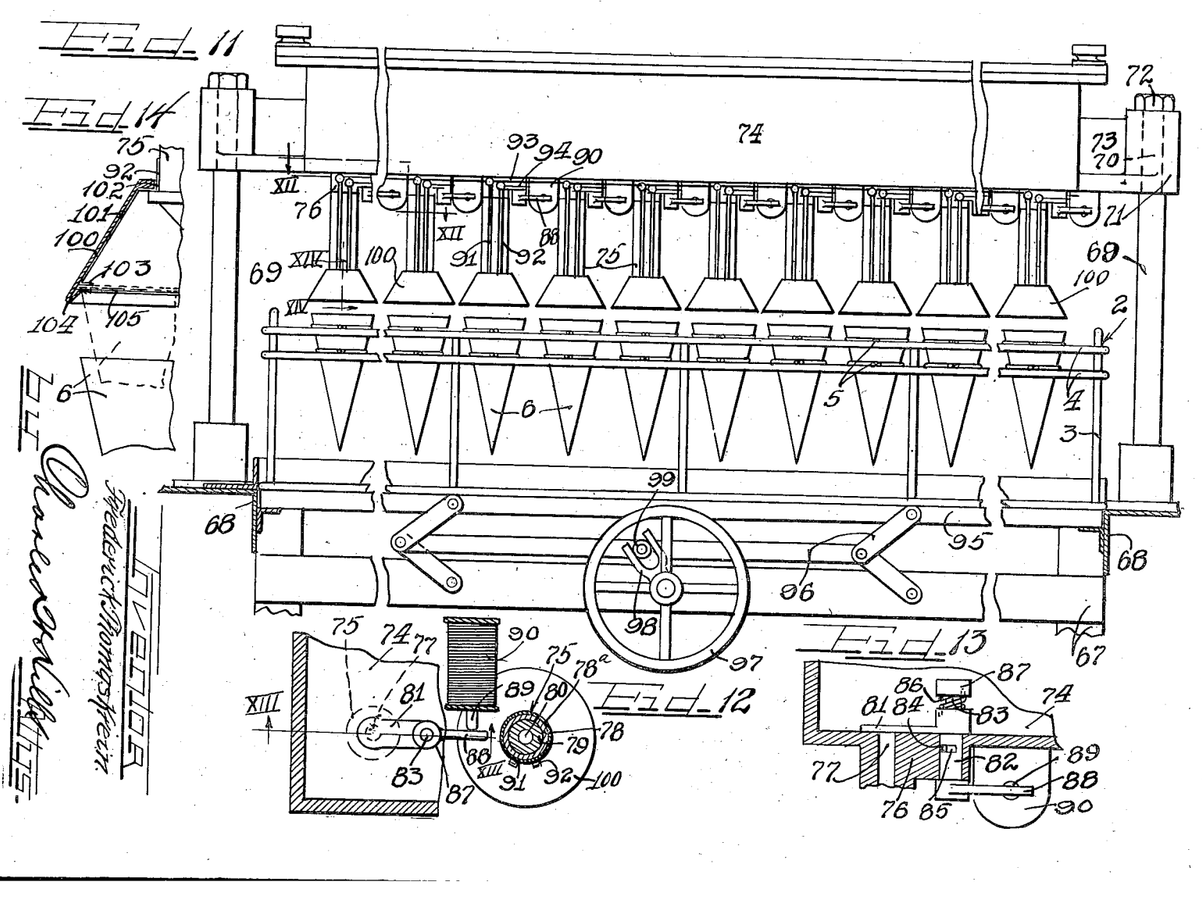
Figure 11 is a fragmentary part sectional, part elevational view of a different form of apparatus, specifically differing in the supporting mechanism and the valve control mechanism.
Figure 12 is an enlarged, fragmentary sectional view taken substantially as indicated by the staggered section line XII—XII of Figure 11, looking in the direction of the arrows.
Figure 13 is also a fragmentary sectional view taken substantially as indicated by the line XIII—XIII of Figure 12, looking in the direction of the arrows.
Figure 14 is an enlarged fragmentary vertical sectional view taken substantially as indicated by the line XIV—XIV of Figure 11, looking in the direction of the arrows.

Spaced conductive inserts 91 and 92 are provided in the external face of each of the spraying units 75. These conductors or bars 91 of the respective spraying units 75 are interconnected, as indicated in Figure 11, by a conductor 93. Each of the conductor bars 92 is connected by means of a conductor 94 to one end of its respective solenoid coil. The opposite ends of the solenoid coils may be connected to a common conductor, not shown in the drawings, in a well-known manner, and this common conductor, together with the conductor 93, may be connected to a suitable source of electrical energy. It will be appreciated, therefore, that a solenoid 90 will not be energized to open its respective valve 81 and permit the discharge of melted chocolate unless the respective conductor bars 91 and 92 are bridged by a conductive element in a manner to be later described.

As indicated above, the hopper 74 in this instance is fixed in position. Therefore, suitable mechanism is provided for elevating the cups towards the hopper. This mechanism includes a floating platform 95 upon which the tray 2 holding the cups 6 is placed. This floating platform 95 is connected by a suitable link and toggle mechanism 96 to a fixed portion of the understructure 67. Upon the actuation of a wheel or handle 97, either by hand or by a mechanical drive, a bifurcated member 98 attached to the shaft of the wheel and engaged over a projection 99 from the link and toggle mechanism actuates this link and toggle mechanism in a manner to cause the floating platform 95 to be elevated towards the spraying mechanism. A reverse movement of the wheel 97 properly controls and prevents the sudden dropping of the platform 95 due to gravity.

Each of the spraying units 75 is provided with a hood 100 slidable up and down on the unit. As above stated, the hood prevents the spraying of chocolate anywhere except within the cup associated with that hood. In this instance, the hood 100 is, of course, made of non-conductive material. Further, the hood, as seen best in Figure 12, is cut out around the projecting portions of the conductive inserts 91 and 92 so that the hood is prevented from rotating relatively to its respective spray nozzle 75.

Secured in any desired manner to the inner face of the hood is a conductive strip 101 (Figure 14) which is bent around the top flange of the hood, as indicated at 102, so that the strip will always ride upon the contact bar 92. The lower end of the strip within the hood is turned inwardly, as at 103, a distance above the lower edge of the hood. A similar strip in spaced relationship to the strip 101 is provided for the contact bar 91. The lower edge of the hood is rolled inwardly and upwardly as at 104 to form a shoulder to support an annular conductive ring 105 which loosely rests upon the shoulder 104. This ring has an outside diameter of such size that the ring may move freely up and down within the hood for a short distance. The roll at the lower edge of the hood to form the shoulder 104 is preferably a relatively deep roll so that the hopper will project materially below the ring 105.

As the platform 95 is moved upwardly in the manner previously described, the upper edge of a cup 6 upon entering the hopper will contact the ring 105 and raise this ring so as to bridge the portions 103 of the contact strips 101 associated with the bars 91 and 92 and thus complete the circuit through the respective solenoid 90 for the actuation of the respective valve 81 so that the chocolate will be sprayed into the cup. It is obvious, therefore, that in the event one of the sockets in the tray 2 is not provided with a cup, the hood will be raised by the cross members 5 of the tray which contact the lower edge of the hood, but in the absence of a cup, the ring 105 will not be raised within the hood to bridge the contacts and thus open the spraying valve. It is apparent, therefore, that if a cup is inadvertently left out of a tray, the spraying nozzle corresponding to the empty socket will not function to spray chocolate.

In operating the structure shown in Figures 11 to 14, inclusive, it is simply necessary to place a tray of cups upon the platform 95, then rotate the wheel 97 to raise the platform a suitable distance, and then lower the platform to original position. During this movement of the platform, the cups are raised within the respective hoods 100, raising the respective rings 105 so as to actuate the spraying nozzles, and the chocolate is sprayed into the cups in the manner previously described both on the up and down movements over the spraying nozzles 75. As above stated, in the event one of the sockets of the tray is not provided with a cup, the spraying nozzle 75 corresponding to that particular socket will not function.

From the foregoing, it is apparent that I have provided a new and novel method of simply and economically making a chocolate covered frozen confection, packaged in a temporary wrapper, and progressively or completely strippable from the confection, as may be deemed desirable. Further, I have provided apparatus simple in construction for providing a chocolate coating for the confection, apparatus that may be made in any desirable size, and function easily and simply to provide a chocolate coating for the confection positively, uniformly and progressively with a minimum of labor. The apparatus disclosed and the method taught herein necessitate only one more operation than is entailed in the freezing or packaging of ordinary ice cream in a temporary confection. That operation is a mere raising and lowering of the apparatus or the containers, as the case may be. It will be noted that by the method taught herein, and with apparatus of the character disclosed, chocolate coated frozen confections in a number of different styles may readily be provided with almost the economy that the confection alone may be packaged.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. The method of preparing a chocolate coated frozen confection, including chilling a container, continuously, progressively and uniformly spraying the container with chocolate, filling the container to a desired extent with a confectionery mass, and refrigerating the whole to harden the mass.

2. The method of packaging and dispensing a frozen confection, including chilling a temporary container, continuously, progressively and uniformly spraying an edible lining in said container, filling the container to a desired extent with a plastic mass of confection, freezing said mass, and stripping the container from the composite frozen confection.

3. The method of preparing a frozen confection package, including progressively and uniformly spraying an edible lining in a container from a region at one end of the container to the other and then repeating the spraying operation in the reverse direction, filling the container with a confection, and refrigerating the whole to harden the confection.

FREDERICK THOMAS KREIN.